United States Patent
Gu et al.

(10) Patent No.: US 12,455,201 B2
(45) Date of Patent: Oct. 28, 2025

(54) RAPID ULTRASONIC DUAL-WAVE CALIBRATED DETECTION METHOD FOR AXIAL FORCE OF HIGH STRENGTH BOLT

(71) Applicants: SUZHOU PHASERISE TECHNOLOGY CO., LTD., Suzhou (CN); BEIJING GOLDWIND SMART ENERGY TECHNOLOGY CO., LTD., Beijing (CN)

(72) Inventors: Fubin Gu, Beijing (CN); Bo Cao, Beijing (CN); Feng Tian, Beijing (CN); Yang Zhao, Beijing (CN); Xiaohui Di, Beijing (CN); Kun Li, Suzhou (CN); Long Yang, Suzhou (CN); Xuxiang Zhu, Suzhou (CN); Yuping Shen, Suzhou (CN)

(73) Assignees: SUZHOU PHASERISE TECHNOLOGY CO., LTD., Suzhou (CN); BEIJING GOLDWIND SMART ENERGY TECHNOLOGY CO., LTD., Beijing (CN)

( * ) Notice: Subject to any disclaimer, the term of this patent is extended or adjusted under 35 U.S.C. 154(b) by 331 days.

(21) Appl. No.: 18/023,076

(22) PCT Filed: Sep. 30, 2020

(86) PCT No.: PCT/CN2020/119333
§ 371 (c)(1),
(2) Date: Feb. 24, 2023

(87) PCT Pub. No.: WO2022/041398
PCT Pub. Date: Mar. 3, 2022

(65) Prior Publication Data
US 2023/0221198 A1 Jul. 13, 2023

(30) Foreign Application Priority Data
Aug. 25, 2020 (CN) .......................... 202010861311.2

(51) Int. Cl.
  *G01L 1/25* (2006.01)
  *G01N 29/07* (2006.01)
  *G01N 29/24* (2006.01)

(52) U.S. Cl.
  CPC .............. *G01L 1/255* (2013.01); *G01N 29/07* (2013.01); *G01N 29/24* (2013.01); *G01N 2291/0234* (2013.01)

(58) Field of Classification Search
  None
  See application file for complete search history.

(56) References Cited

U.S. PATENT DOCUMENTS

| | | | | |
|---|---|---|---|---|
| 3,975,948 A | * | 8/1976 | Makino | ................... G01L 5/246 73/761 |
| 2017/0363491 A1 | * | 12/2017 | Klein | ....................... G01L 1/255 |
| 2019/0203599 A1 | * | 7/2019 | Sun | ..................... G01M 5/0041 |

FOREIGN PATENT DOCUMENTS

| CN | 108375433 A | 8/2018 |
|---|---|---|
| CN | 108917805 A | 11/2018 |

(Continued)

OTHER PUBLICATIONS

Xu Ding et al., "Development of EMAT based axial load measurement system for in-service bolts" Non-destructive Testing, 2016, vol. 38, No. 6, pp. 48-64 (Jun. 1, 2016).

(Continued)

*Primary Examiner* — Suman K Nath
(74) *Attorney, Agent, or Firm* — SZDC Law PC

(57) ABSTRACT

A rapid ultrasonic dual-wave calibrated detection method includes: numbering a plurality of high strength bolts; searching, in a database in equipment, a calibrated empirical value $R_{0e}$ of initial ratios $R_0$ of ultrasonic transverse wave transit time to ultrasonic longitudinal wave transit time for bolts with entirely or partially same specification data, or a calibrated empirical value $k_e$ of a slope k of variation of a bolt tension with a ratio of transverse wave transit time to longitudinal wave transit time; measuring ratios $R_i$ of the ultrasonic transverse wave transit time to the longitudinal wave transit time for the plurality of high strength bolts; acquiring a pretightening axial force value, and using the pretightening axial force value in place of an average value of tensions of the plurality of high strength bolts, calculating calibrated another parameter $k_e$ or $R_{0e}$; and calculating axial forces of the high strength bolts.

8 Claims, 3 Drawing Sheets

(56) References Cited

FOREIGN PATENT DOCUMENTS

| CN | 109724742 | A  | 5/2019  |
|----|-----------|----|---------|
| CN | 110514344 | A  | 11/2019 |
| CN | 111307358 | A  | 6/2020  |
| CN | 111537132 | A  | 8/2020  |
| JP | 860216235 | A  | 10/1985 |
| WO | 2015018559| A1 | 2/2015  |

OTHER PUBLICATIONS

Zhou Li et al., "Test and research on bolt axial force of large wind turbine based on ultrasonic technology" Journal of Machine Design, vol. 36, S2, pp. 131-125 (Nov. 30, 2019).

Jian-jun Yi et al., "Ultrasonic Inspection Technique for Axial Forces of Bolts in Cable Clamps of Suspension Bridge" Bridge Construction, vol. 49, No. S1, pp. 68-73 (Dec. 31, 2019).

\* cited by examiner

RAPID ULTRASONIC DUAL-WAVE CALIBRATED DETECTION METHOD FOR AXIAL FORCE OF HIGH STRENGTH BOLT

This application is the National Stage Application of PCT/CN2020/119333, filed on Sep. 30, 2020, which claims priority to Chinese Patent Application No. 202010861311.2, filed on Aug. 25, 2020, which is incorporated by reference for all purposes as if fully set forth herein.

FIELD

The present disclosure relates to the technical field of detecting the axial force of a bolt, in particular to a rapid ultrasonic dual-wave calibrated detection method for an axial force of a high strength bolt.

BACKGROUND

High strength bolts have been widely used in many industries. Typical large-scale application fields include fixing of a tower and blades of a wind turbine, fixing of a track and a sleeper of a high-speed railway, and connection of components of a highway bridge, etc.

In the case of a wind turbine as an example, the wind turbine is generally supported by using a tower, and the stability of a tower installation structure influences the service life of the wind turbine. The wind turbine uses a large number of high strength bolts. One wind turbine generally includes at least 6 or more flange faces, each of which includes about 100 high strength bolts. Axial forces (axial-direction forces) or tensions and tension distribution of the high strength bolts of the wind turbine are closely related to the safety and reliability of the wind turbine. Each blade of the wind turbine is also mostly connected to a hub by high strength bolts on one flange face. The number of the high strength bolts used in such a wind turbine is in the order of 1000.

In the case of tracks of a high-speed railway as an example, the high-speed railway generally uses a ballast less track. For such a track, high strength bolts are generally used to lock tracks to reinforced concrete sleepers. Usually, the spacing of the sleepers is 40 centimeters, at least 4 bolts are used on each sleeper, such that tens of thousands of bolts are present in each kilometer of high-speed railway.

During construction with high strength bolts, the bolts are generally fastened by using a torque wrench, and each bolt is screwed to an expected torque value. Since the torque value can be controlled within a certain range by the torque wrench, it is often assumed that an axial force value of each bolt will also be controlled within a certain range.

Assuming that there is a fixed linear relationship between the torque value and the axial force value, a bolt is considered to reach a certain axial force value when the bolt is screwed to a certain torque value. However, the axial force value and the torque value of the bolt are usually not in a linear relationship, or, are in a linear relationship but with a large variation in a linear coefficient. Since it is not possible to calibrate the linear coefficient between the torque value and the axial force value for each bolt, it is common to select a linear coefficient that is considered reasonable or that has been calibrated for other bolts in the same batch during construction. Reuse of the high strength bolts may affect this linear relationship, and thus industry standards even generally prohibit reuse of high strength bolts. Therefore, an average value of torques and an average value of axial force values can have a very good or even very accurate correspondence relationship. However, the concept of the axial force value is different from that of the torque value. After the high strength bolts are put into construction by a torque wrench, a mean square deviation of distribution of axial force values is usually much greater than a mean square deviation of distribution of torque values. There is also another construction method for high strength bolts, known as a tensioning construction method. In construction by this method, an average value of axial forces can be well provided, but a mean square deviation of distribution of axial forces is still large, usually reaching about half that of the torque wrench construction method. No matter which construction method is used, both a construction party and a supervision and inspection party only know the average axial force of a large number of bolts in the same batch after construction, but previous project construction party or supervision and inspection party has no mature, reliable, fast and economic method to determine the specific axial force of each bolt.

Due to uncertainty about the axial force value of each bolt, the bolt is re-screwed using bolt torque every six months to several years after installation of the wind turbine, which consumes a lot of labor costs but does not fundamentally solve the related safety problems. Furthermore, since true axial force conditions of the bolts are not known, the service lives of the bolts may be shortened when the bolts in a normal axial force range are re-screwed using the torque. There is currently no good means for measuring axial forces of bolts on a railway, so that for the sake of safety, the tracks of the high-speed railways are directly scrapped for new based on a certain time cycle, which undoubtedly increases the cost. There is also a lack of effective means for detecting and monitoring axial forces of bolts on highway bridges. Usually, a vibration sensor is used to detect and monitor local excessive vibrations on the bridge to infer and suspect axial force abnormality of the bolts around. Moreover, even if axial force abnormality is suspected, an engineering remedy method is to tighten the bolts with a torque by using a torque wrench rather than making the axial force of the bolt reach a preset value.

Therefore, it is very important to directly measure the axial forces of the high strength bolts. An ultrasonic dual-wave stress detection method can detect stresses (tensions or axial forces) of the bolts without knowing the original lengths of the bolts, and this method can precisely and directly detect axial force conditions of the high strength bolts. However, due to limitation of the efficiency required for ultrasonic dual-wave detection of axial forces of high strength bolts sometimes, only a batch or a small number of bolts on the same flange face are usually sampled in engineering application, for example, only 5% of bolts are sampled. Such sampling causes a potential risk of missed detection of important bolts. Therefore, increasing the speed of ultrasonic dual-wave detection of the high strength bolts brings an important engineering practical value. Moreover, the ultrasonic dual-wave axial force detection takes a very large proportion of the time to calibrate the bolts using a tensile machine.

In the ultrasonic dual-wave stress detection, a bolt tension F and a ratio R of ultrasonic transverse wave transit time to ultrasonic longitudinal wave transit time are in a relationship as follows under first-order approximation:

$$F = k(R - R_0) \tag{1}$$

where $R_0$ is an initial ratio of ultrasonic transverse wave transit time to ultrasonic longitudinal wave transit time in a zero tension state, and k is a proportional constant. There are two constants k and $R_0$ in this equation, and these two constants are usually obtained by calibrating bolts in the same batch by a tensile machine. The tensile machine is a hydraulic mechanical device that can provide a set tension for a bolt. Different ultrasonic measured values R in equation (1) are tested by setting a group of different tension values, thus calibrating the two constants k and $R_0$ in equation (1) for the bolt. Sometimes, some of bolts with the same specification in the same batch are set aside as spare parts in specific application services, in this way, the spare parts can be used as samples to calibrate the constants in equation (1) by the tensile machine, and the calibrated constants are applied to the bolts in the same batch as in the services. Usually, the tensile machine is large in volume and only suitable to be separately and fixedly arranged in a laboratory with temperature and humidity control, which is relatively far from the geographical location where high strength bolts are in actual services. For example, a wind power plant is generally built at a location with abundant wind resources, which is also a relatively remote place, so it is very time-consuming, laborious and costly to take spare bolts from the wind power plant to the tensile machine for calibration.

However, sometimes in field engineering application, no spare new bolts are available with the same specification in the same batch of services for calibration on the tensile machine. In this way, the two coefficients in equation (1) can only be calibrated based on a database or experience. The constant k is related to material properties and a clamping length ratio of the bolts. For the high strength bolts, a rich database can be established to determine a k value of the bolts at a field test relatively precisely. The measurement of an $R_0$ value is much more complicated, and is related to the geometry of the bolt in addition to material parameters of the bolt. The influencing factors include the type of material of the bolt, the compactness of the material, the structure of the material, the specification of the bolt, the thickness or depth of the inscription on a hexagonal head of the bolt, the layout of the inscription on the hexagonal head of the bolt, the specific text on the hexagonal head of the bolt, an ejector pin hole in a screwed face, the unevenness of the end face of the screw, the length of a thread, and other factors. Therefore, different $R_0$ values may be obtained for bolts from different manufacturers, depending on the extent to which the above influencing factors are eliminated from hardware and software of measurement equipment.

CONTENT OF INVENTION

In view of the above technical problems, the present disclosure aims to provide a rapid ultrasonic dual-wave calibrated detection method for the axial force of a high strength bolt. The method uses a pretightening axial force value in place of an average value of axial forces of a plurality of samples to calibrate initial ratios of ultrasonic transverse wave transit time to transit longitudinal wave transit time in a zero stress state, or a slope of variation of a bolt tension with a ratio of the of transverse wave transit time to longitudinal waves transit time, without using a tensile machine for calibration, such that some bolts with lower axial forces and bolts with higher axial forces can be selected rapidly.

A technical solution of the present disclosure is as follows:

A rapid ultrasonic dual-wave calibrated detection method for an axial force of a high strength bolt, including the following steps:

S01: numbering a plurality of high strength bolts in a same detection region;

S02: searching, in a database in equipment, a calibrated empirical value $R_{0e}$ of initial ratios $R_0$ of ultrasonic transverse wave transit time to ultrasonic longitudinal wave transit time for high strength bolts with entirely or partially same specification data in a zero stress state, or a calibrated empirical value $k_e$ of a slope k of variation of a bolt tension with ratios of transverse wave transit time to longitudinal wave transit time;

S03: measuring ratios $R_i$ of the ultrasonic transverse transit time to the ultrasonic longitudinal wave transit time for the plurality of high strength bolts;

S04: acquiring a pretightening axial force value, using the pretightening axial force value in place of an average value of tensions of the plurality of high strength bolts, and calculating calibrated another parameter $k_e$ or $R_{0e}$; and S05: calculating axial forces of the high strength bolts according to the calibrated parameters $k_e$ or $R_{0e}$.

In a preferred technical solution, in step S02, before searching in the database in the equipment, whether surplus new uninstalled bolts in the same batch are present in the same detection region is determined first, if so, an average value of the initial ratios $R_0$ of the ultrasonic transverse transit time to the ultrasonic longitudinal wave transit time for the plurality of high strength bolts in the zero stress state is used as the calibrated empirical value $R_{0e}$, otherwise, searching is performed in the database in the equipment.

In a preferred technical solution, in step S04, if the calibrated empirical value $k_e$ of the slope k of the high strength bolts with the entirely same specification data is searched in the database in the equipment, $$R_{0e} = \overline{R_i} - \frac{F_p}{k_e},$$

where $\overline{R_i}$ is an average value of the ratios $R_i$ of the ultrasonic transverse wave transit time to the ultrasonic longitudinal wave transit time for the plurality of high strength bolts, i represents bolt numbers, and $F_p$ represents a pretightening axial force value.

In a preferred technical solution, in step S04, if the calibrated empirical value $R_{0e}$ of the initial ratios $R_0$ of the transverse wave transit time to the longitudinal wave transit time for the high strength bolts with the entirely same specification data is searched in the database in the equipment, $$k_e = \frac{F_p}{\overline{R_i} - R_{0e}}.$$

In a preferred technical solution, in step S04, if a calibrated estimated value $k_e'$ of the slopes k of the high strength bolts with the partially same specification data is searched in the database in the equipment, a calibrated estimated value of the initial ratio $R_0$ is $$R_{0e}' = \overline{R_i} - \frac{F_p}{k_e'},$$

and an estimated axial force value of the high strength bolts is calculated:

$$F'_i = k'_e\left(R_i - \overline{R}_i + \frac{F_p}{k'_e}\right) = k_e(1 + \Delta_{k_e})\left[R_i - \overline{R}_i + \frac{F_p}{k_e(1 + \Delta_{k_e})}\right],$$

where $\Delta_{k_e}$ is a relative error of $k_e$.

In a preferred technical solution, in step S04, if the calibrated estimated value $R_{0e}'$ of the initial ratios $R_0$ of the transverse wave transit time to the longitudinal wave transit time of the high strength bolts with the partially same specification data is searched in the database in the equipment, a calibrated estimated value of the slope k $$k'_e = \frac{F_p}{\overline{R}_i - R_{0e}},$$

and an estimated axial force value of the high strength bolts is calculated:

$$k'_e = \frac{F_p}{\overline{R}_i - R'_{0e}} = \frac{F_p}{(\overline{R}_i - R_{0e})(1 + \Delta_{R_{0e}})},$$

where $\Delta_{R_{0e}}$ is a dimensionless relative deviation value of a difference between the average value $\overline{R}_i$ of $R_i$ and an actual true value of $R_{0e}$.

In a preferred technical solution, step S05 further includes: if the number n of calculated high strength bolts is greater than a certain value, determining whether the measured axial force values of the bolts are within a deviation range set for $F_p$, if so, determining that the measured axial force values are qualified; otherwise, determining that the measured axial force values are unqualified.

In a preferred technical solution, the specification data includes specification model, length, thread length, nut thickness, nut position, bolt head thickness and bolt material.

Compared with the prior art, the present disclosure has the following advantages:

1. The benefits of the present disclosure for practical engineering application are very obvious. Firstly, the method eliminates the complicated and laborious procedure of calibration by a tensile machine, which greatly improves the detection efficiency and reduces the cost. Secondly, the method uses the central limit theorem to ensure that precise axial force values of individual bolts can be obtained by a certain number of samples. Thirdly, the method can also obtain precise relative axial force distribution of the bolts, because the method uses bolt samples in the same batch to calibrate other bolts in the same batch, and even if there is certain unknown systematic error, such as an overall higher or overall lower systematic error, such an error does not affect the relative magnitudes of axial forces of all the bolts.

2. The method has the advantage of measuring the distribution of the axial force values of the bolts in the same batch relatively precisely, which is very important for rapid and large-scale pre-screening detection, and is of great significance for saving engineering costs. Sometimes, relative axial force distribution is more important than accurate axial forces of the individual bolts, because bolt fracture, which is generally recognized as the most fatal situation, is usually preceded by a bolt tension problem, and the bolt tension problem is preceded by abnormality caused by non-uniform axial force distribution of the bolts. The method is very effective in quickly picking out some bolts with lower axial forces and bolts with higher axial forces.

BRIEF DESCRIPTION OF THE DRAWINGS

The present disclosure will be further described in conjunction with the accompanying drawings and embodiments.

DETAILED DESCRIPTION OF THE EMBODIMENTS

To make the objectives, technical solutions and advantages of the present disclosure clearer and more apparent, the present disclosure will be further described in detail below in conjunction with specific implementations and with reference to the accompanying drawings. It should be understood that such description is merely exemplary and not intended to limit the scope of the present disclosure. In addition, in the following description, the descriptions of well-known structures and technology are omitted to avoid unnecessary confusion of concepts in the present disclosure.

Figure 1:
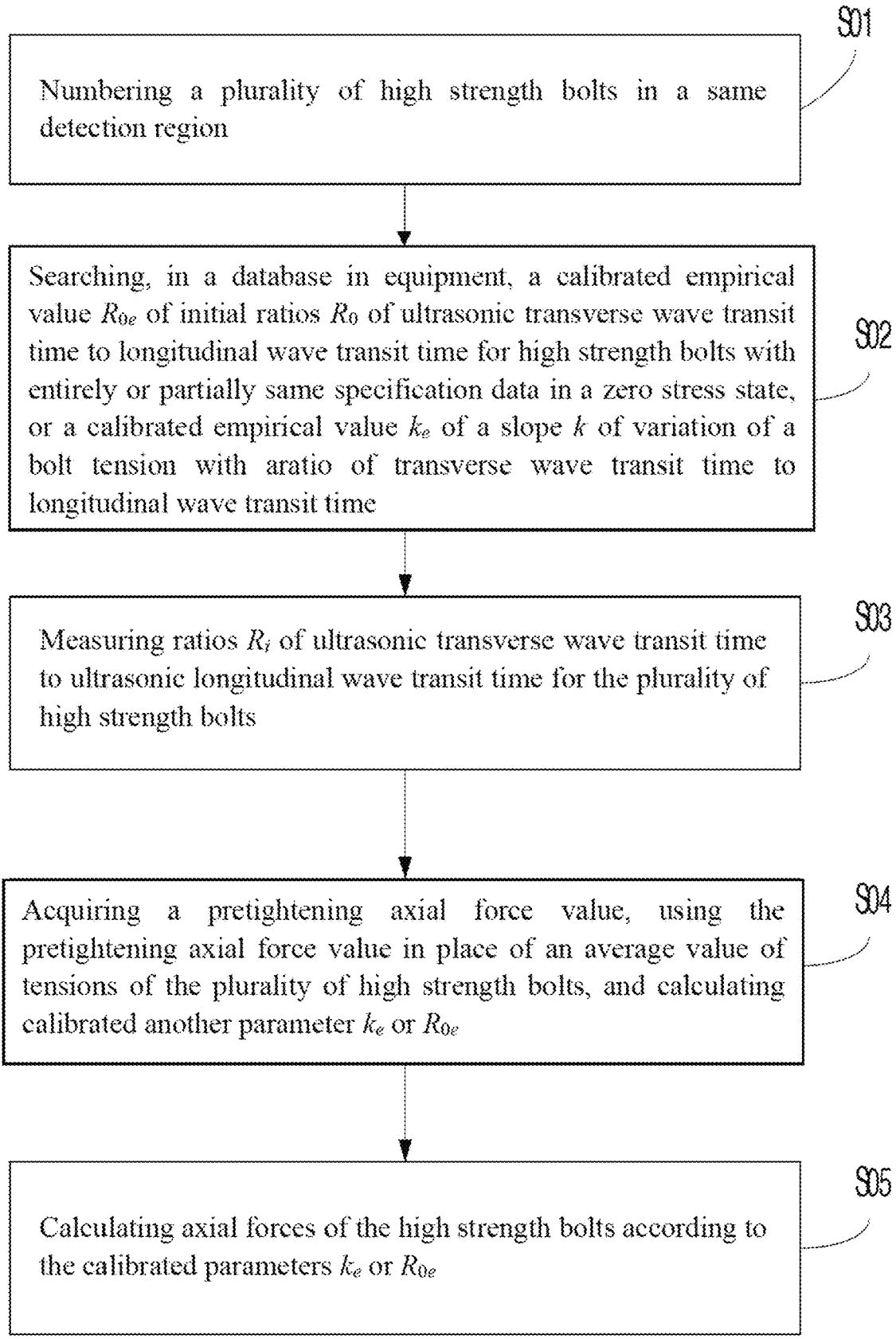
FIG. 1 is a flow chart of a rapid ultrasonic dual-wave calibrated detection method for an axial force of a high strength bolt.

As shown in FIG. 1, a rapid ultrasonic dual-wave calibrated detection method for an axial force of a high strength bolt, including the following steps:

S01: numbering a plurality of high strength bolts in a same detection region;

S02: searching, in a database in equipment, a calibrated empirical value $R_{0e}$ of initial ratios $R_0$ of ultrasonic transverse wave transit time to ultrasonic longitudinal wave transit time for high strength bolts with entirely or partially same specification data in a zero stress state, or a calibrated empirical value $k_e$ of a slope k of variation of a bolt tension with a ratio of transverse wave transit time to longitudinal wave transit time;

S03: measuring ratios $R_i$ of the ultrasonic transverse wave transit time to the ultrasonic longitudinal wave transit time for the plurality of high strength bolts;

S04: acquiring a pretightening axial force value, using the pretightening axial force value in place of an average value of tensions of the plurality of high strength bolts, and calculating calibrated another parameter $k_e$ or $R_{0e}$; and S05: calculating axial forces of the high strength bolts according to the calibrated parameters $k_e$ or $R_{0e}$.

Before high strength bolts for a wind turbine are mounted for construction, a torque wrench manufacturer, a bolt tensioner manufacturer or a construction party should calibrate the average axial force of the bolts in the same batch as expected or according to process experiments after construction. After the bolts are put into construction, the axial forces of all the bolts are in normal distribution, and an average value of the normal distribution is a pretightening axial force value required before construction. Such correspondence relationship where the average value of the axial forces of the bolts is the pretightening axial force value can be ensured by the central limit theorem when the number of the bolts in the same batch reaches a certain number, e.g. 30 or more.

A torque wrench has a construction torque error for each bolt. Such errors are in normal distribution, with an average value denoted as $\overline{M}$ and a mean square deviation denoted as $\delta M$. These two parameters can be provided by the manufacturer of the torque wrench used in the construction. For a torque wrench with high precision control on the market at present, the precision of $\delta M/\overline{M}$ can generally reach a value between 1% and 3%, which means that each time the torque wrench screws a bolt, there is a 68% probability that a torque value shown differs from an actual torque value by a certain number in the range of 1% to 3%. A corresponding average value of the tension of each bolt after application of a pretightening axial force for construction by the torque wrench is a pretightening axial force $F_p$ with a mean square deviation $\delta F_p$. The two values can be provided by an entity designing a bolt construction process. In engineering application, $\delta F_p/F_p$ after construction is generally much greater than $\delta M/\overline{M}$, but not up to 10 times $\delta M/\overline{M}$, i.e., no more than 30%. From another point of view, the pretightening axial force $F_p$ is generally 70% of the yield strength of the bolt, and $\delta F_p/F_p$ up to 30% means that there are two states in which the bolt reaches the yield strength or the bolt is almost completely loosened, but there is a very low probability of such an occurrence in the conditions of practical engineering application. In practical engineering application, $\delta F_p/F_p$ can generally be considered to be no more than 10%, so the use of 30% here as an upper limit of $\delta F_p/F_p$ suffices to reflect and meet the conditions in actual engineering construction.

According to the central limit theorem, a certain number of bolts in the same batch after construction are randomly selected, and an average value $\overline{F}$ of the tensions of the bolts is in normal distribution, and a mean squared deviation or standard deviation is $\delta F$. As the number of the randomly selected bolts increases, the standard deviation $\delta F$ becomes smaller, and the average value $\overline{F}$ becomes closer to a true average value $F_p$ of axial forces of all the bolts. Assuming that n bolts are selected, the standard deviation $\delta F$ of the average value $\overline{F}$ according to the central limit theorem is:

$$\delta F = \frac{\delta F_p}{\sqrt{n}}. \tag{2}$$

Generally, it can be considered that the engineering application is satisfied when the sample number n reaches 30. If n=30, $\delta F = \delta F_p/\sqrt{30} < 30\% \overline{F_p}/\sqrt{30} \approx 5\% F_p$. That is to say, the difference between the average value of the tensions of the 30 bolts and the actual average value of all the bolts, i.e., the pretightening axial force $F_p$, will not exceed 5%.

If the construction with the high strength bolts is carried out by a tensioning method instead of a torque method, $\delta F_p/\overline{F_p}$ is generally less than 15%, which is half less than that in the torque method. In this case, if n=100, equation (2) can yield $\delta F = \delta F_p/\sqrt{100} < 15\% F_p/\sqrt{100} = 1.5\% F_p$. In the case of a flange of a wind turbine as an example, there are generally more than 100 bolts on one flange face, so n being in the order of 100 is also feasible in engineering application. In the case of high strength bolts for a ballast less track of a high-speed railway as an example, there can be tens of thousands of bolts per 1 km of length generally, so n being in the order of 10000 is also feasible in engineering application. In short, in practical engineering application, the value of n can generally be at least 30 or more to ensure that the central limit theorem mentioned in the present disclosure functions reliably, and sometimes, n can also have a higher and better value such as 100 or even 10000.

Before dual-wave stress detection of high strength bolts, if a parameter in equation (1) is relatively uncertain, the parameter can be controlled within a relatively small fluctuation range without using a tensile machine. For example, if the empirical value $k_e$ of the slope k in equation (1) is obtained by searching the database before the detection, but $R_0$ is uncertain, equation (1) can be rewritten as:

$$R_0 = R - \frac{F}{k_e}. \tag{3}$$

Then no less than 30 bolts are selected and measured to obtain 30 values of R in equation (3), denoted as $R_i$. For the no less than 30 bolts, an expected value or an average value is calculated by using equation (3):

$$\overline{R_0} = \overline{R_i} - \frac{\overline{F}}{k_e}. \tag{4}$$

Since the average value of axial forces of the samples does not differ much from an axial force value of the overall samples, i.e., the pretightening axial force value, the average value of the axial forces in equation (4) can be replaced by the pretightening axial force value. That is, $$R_{0e} \equiv \overline{R_0} = \overline{R_i} - \frac{F_p}{k_e}. \tag{5}$$

Here, $R_{0e}$ is defined as an empirical initial ratio of transverse wave transit time to longitudinal wave transit time. According to the central limit theorem, $R_{0e}$ is in normal distribution. The values of $R_{0e}$ obtained from the 30 samples do not differ much from an average value of actual calibrated values of $R_0$ for the entire batch of bolts. Substituting equation (5) into equation (1) yields:

$$F_i = k_e(R_i - R_{0e}) \tag{6}.$$

The subscript i here denotes all numbers of the measured bolts, including the no less than 30 bolts selected previously. The subscript e denotes a selected calibrated empirical value.

Since the measurements of the values of R and $R_0$ involve many same influencing factors, the subtraction of R and $R_0$ in equation (1) can eliminate some common factors that affect the accuracy of the measurements, which further improves the accuracy of the measurement on the bolt tension F in equation (1), and thereby further improves the reliability of equation (6), because the calibration of $R_{0e}$ in equation (6) is performed by multiple measurements on the values of R.

If $R_0$ in equation (1) is calibrated in advance or it is considered that the range of values of the parameter is very reliable before the dual-wave stress detection for the high strength bolts, for example, an empirical value of $R_0$ is $R_{0e}$, but the value of the slope k in equation (1) is not very certain, in this case, equation (1) can be rewritten as:

$$k = \frac{F}{R - R_{0e}}. \tag{7}$$

Then no less than 30 bolts are selected and measured to obtain 30 values of R in equation (7), denoted as $R_i$. For the no less than 30 bolts, an expected value or an average value is calculated by using equation (7):

$$\overline{k} = \frac{\overline{F}}{\overline{R}_i - R_{0e}}. \tag{8}$$

Since the average value of axial forces of the samples does not differ much from the axial force value of the overall samples, i.e., a pretightening axial force value, the average value of the axial forces in equation (8) can be replaced by the pretightening axial force value. That is, $$k_e \equiv \overline{k} = \frac{F_p}{q\overline{R}_i - R_{0e}}. \tag{9}$$

Here $k_e$ is defined as a calibrated k value or an empirical k value. According to the central limit theorem, $k_e$ is in normal distribution. The values of $k_e$ obtained from the 30 samples do not differ much from an average value of actual calibrated values of k for the entire batch of bolts. Substituting equation (9) into equation (1) yields:

$$F_i = k_e(R_i - R_{0e}) \tag{10}.$$

The subscript i here denotes all numbers of the measured bolts, including the no less than 30 bolts selected previously. The subscript e denotes a calibrated empirical value.

If the values of k and $R_{0e}$ in equation (1) are not calibrated by a tensile machine for the bolts with the specification and type before dual-wave stress detection for the high strength bolts, and thus there is no corresponding data for a bolt specification completely consistent therewith in the database, data for bolts with a similar specification can be searched in the database to fill in equation (1). For example, a slope value $k_e'$ for bolts with a similar specification is selected from the database, and assuming there is a 10% error between $k_e'$ and a true value $k_e$, a difference between an estimated value of a bolt axial force calculated from the estimated slope value and a true value is much less than 10%. This is proved as follows:

It is assumed that here is a relational expression between the estimated value $k_e'$ of k and the true value $k_e$ as follows:

$$k_e' = (1 + \Delta_{k_e})k_e$$

where $\Delta k_e$ is a relative ratio of a difference between the estimated value and the actual true value. An error of the slope k in equation (1) between bolts with similar specifications in the bolt empirical database generally does not exceed 10%, which means that $\Delta k_e$ is generally less than 10%. Substituting $k_e$ in equation (5) with $k_e'$ yields an initial ratio $R_{0e}'$ of transverse wave transit time to longitudinal transmit time with an error, which is calculated from the value $k_e'$ with an error from k.

$$R_{0e}' = \overline{R}_i - \frac{F_p}{k_e'}. \tag{12}$$

Substituting equation (12) into equation (1) yields the axial force value $F_i'$ of the bolt calculated with an estimated deviation:

$$F_i' = k_e'\left(R_i - \overline{R}_i + \frac{F_p}{k_e'}\right) = k_e(1 + \Delta_{k_e})\left[R_i - \overline{R}_i + \frac{F_p}{k_e(1 + \Delta_{k_e})}\right]. \tag{13}$$

If $k_e'$ has no error, equation (13) becomes:

$$F_i = k_e\left(R_i - \overline{R}_i + \frac{F_p}{k_e}\right). \tag{14}$$

Assume:

$$F_i' = F_i(1 + \Delta_{F_i}) \tag{15}$$

and $$F_i = F_p(1 + \delta) \tag{16},$$

where $\Delta F_i$ is a relative error between the calculated estimated axial force value $F_i'$ and a true axial force value $F_i$. $\delta$ is a relative deviation value between the individual true axial force value and the average axial force value.

Equations (13) to (16) are combined to solve:

$$\Delta_{F_i} = \frac{\delta}{1 + \delta}\Delta_{k_e}. \tag{17}$$

Generally, in previous engineering application, the individual axial force true value $F_i$ is considered to be qualified when the axial force true value is 20% around the average value of axial forces, i.e., the pretightening force $F_p$. Thus, when $\delta = \pm 0.2$, the coefficient in the equation (17) is as $$\frac{\delta}{1 + \delta} = [-0.25 \ 0.17].$$

Equation (17) can be organized as follows:

$$\Delta_{F_i} = [-0.25 \ 0.17]\Delta_{k_e} \tag{18}.$$

That is to say, when the estimated value of the slope k in equation (1) has a 10% relative error with respect to the true value, a relative error of the measured axial force value $F_i'$ calculated from the slope $k_e'$ value with an error, with respect to the true value $F_i$, is likely to be substantially less than the relative error of the slope by 10%. For example, if the true axial force value is ±20% around the pretightening value, the measured axial force value of the bolt differs from the true value just by a value between −2.5% and 1.7%, which is a relatively small error in engineering application.

It is assumed that the measured value $F_i'$ is x times the average value $F_p$, that is:

$$F_i' = xF_p \tag{19}.$$

Equations (15), (16), (17) and (19) are combined to yield:

$$F_i = \frac{x + \Delta_{k_e}}{1 + \Delta_{k_e}}F_p. \tag{20}$$

This is a monotonic function with respect to x. That is to say, the greater the measured value $F_i'$ is, the greater x is, and the greater the true value $F_i$ is; and the greater the measured value $F_i'$ deviates from the average value $F_p$, the greater the true value $F_i$ deviates from the average value $F_p$. Thus, if the measured axial force value $F_i'$ is not within a preset range of qualification centered on $F_p$, with the addition of a certain tolerance error, it can be expected that the true axial force value $F_i$ is likewise not within the preset range of qualification or the like.

$\Delta k_e = 0.1$ is taken as an example for illustration as follows: if a customer in actual application specifies that $F_i$ is unqualified when being below 80% $F_p$ or above 120% $F_p$, $F_i$ is unqualified when the value of x is smaller than 78% or greater than 122%. The value of x in the range of 82% to 118% denotes qualification. Pre-alarm may be set when the value of x in the range of 78% to 82%, and the value of x in the range of 118% to 122%. In extreme cases where a measured value significantly deviates from $F_p$, e.g., when a nut is almost completely loosened, and the value of x is around 0, the true value $F_i$ obtained from equation (20) is $$\frac{\Delta k_e}{1+\Delta k_e} F_p,$$

i.e., a maximum measurement error is 11% $F_p$ in the case where the bolt is almost completely loosened. According to a preset axial force qualification rule, in the extreme cases where a measured value significantly deviates from $F_p$, the measured value is determined to be unqualified according to judgment rules. Therefore, in previous engineering application, the measurement criteria of qualification and non-qualification in the present disclosure theoretically do not cause significant missed judgments, which is very important for practical engineering application.

Likewise, before dual-wave stress detection for the high strength bolts, if the values of k and $R_0$ for the bolts with the specification and type in equation (1) are not calibrated by a tensile machine, and there is no corresponding data for a bolt specification completely consistent therewith in the database, $R_0$ for bolts with a similar specification can be searched in the database to fill in equation (1). For example, an $R_0$ value, specifically $R_{0e}'$, for bolts with the similar specification is selected from the database, and assuming that there is an error between $R_{0e}'$ and the true value $R_{0e}$, calibrating $k_e$ value by using the estimated $R_{0e}'$ value and equation (9) may produce that a difference between the measured value and the true value of the axial force of the bolt is within a reasonable range that is tolerable in engineering application.

Take an example for illustration: A value of $R_0$ in equation (1), specifically $R_{0e}'$, for a bolt with the similar specification is found in the database, and the relationship between $R_{0e}'$ and the true value $R_{0e}$ is:

$$\overline{R}_i - R_{0e}' = (1+\Delta R_{0e})(\overline{R}_i - R_{0e}) \quad (21).$$

$\Delta R_{0e}$ is a dimensionless relative deviation value of a difference between an average value of $R_i$ and an estimated value of $R_{0e}$ and a difference between the average value of $R_i$ and an actual true value of $R_{0e}$. In practical engineering application and according to the established bolt empirical database, $\Delta R_{0e}$ between bolts with similar specification in equation (21) generally does not exceed 15%. An estimated value $k_e'$ of k is obtained from the estimated initial value $R_{0e}'$ according to equation (9):

$$k_e' = \frac{F_p}{\overline{R}_i - R_{0e}'} = \frac{F_p}{(\overline{R}_i - R_{0e})(1+\Delta R_{0e})}. \quad (22)$$

Substituting equation (22) into equation (1) yields a bolt axial force value $F_i'$ calculated with a deviation:

$$F_i' = k_e'(R_i - R_{0e}') = \frac{F_p}{\overline{R}_i - R_{0e}'}[R_i - R_{0e}']. \quad (23)$$

If $R_{0e}'$ has no error, equation (23) becomes:

$$F_i' = \frac{F_p}{\overline{R}_i - R_{0e}'}[R_i - R_{0e}']. \quad (24)$$

Assume:

$$F_i' = F_i(1+\Delta_{F_i}) \quad (25)$$

and $$F_i = F_p(1+\delta) \quad (26),$$

where $\Delta F_i$ is a relative error between the estimated axial force value $F_i'$ calculated by measurement and the true axial force value $F_i$. $\delta$ is a relative deviation value between the true axial force and the average axial force value.

Equations (21), (23), (24), (25) and (26) are combined to yield:

$$\Delta_{F_i} = \frac{\delta}{(1+\Delta_{R_{0e}})(1+\delta)} \Delta_{R_{0e}}. \quad (27)$$

This equation (27) differs from the previous equation (17) by only one coefficient $$\frac{1}{1+\Delta_{R_{0e}}},$$

and it is not difficult to see that the value of this coefficient is approximately around 1. Therefore, if $\Delta R_{0e}$ in equation (27) is close to $\Delta k_e$ in equation (17), the precision or error given by equation (27) is close to that given by equation (17) in engineering. In fact, the errors given by the two equations are also close to each other in engineering application. A theoretical value of $R_{0e}$ in equation (1) is only related to the material, and is around 1.830. In engineering application, a measured value may deviate from this value due to many other factors such as the bolt surface bearing a textual mark or being coated with anti-corrosion paint. Even so, if $R_{0e}' = 1.830$ is used directly, the absolute value of $\Delta R_{0e}$ in equation (21) is basically within 15% in practical engineering application, and thus a measurement error for $\Delta F_i$ in equation (27) which is within about 20% of the pretightening force does not exceed 5%.

This proves that, according to the method proposed in the present disclosure, even if one parameter in equation (1) has an estimation error, the relative value of the difference between the final measured bolt axial force and the true axial force is much less than the relative error of the estimated value of the parameter after another parameter in equation (1) is calibrated by the method of the present disclosure.

Even if a similar estimated parameter is taken from the empirical database, detection criteria for qualification and non-qualification of the bolt axial force with reliable precision in engineering can be obtained without calibration by the tensile machine in engineering application.

Benefits of the present disclosure for practical engineering applications are very obvious. Firstly, the method eliminates the complicated and laborious procedure of calibration by the tensile machine, which greatly improves the detection efficiency and reduces the cost. Secondly, the method uses the general principle of the central limit theorem to ensure that precise axial force values of individual bolts can be obtained by a certain number of samples. Thirdly, the method can also obtain precise relative axial force distribution of bolts, because the method uses bolt samples in the same batch to calibrate other bolts in the same batch, and even if there is certain unknown systematic error, such as an overall higher or overall lower systematic error, such an error does not affect the relative magnitudes of axial forces of all the bolts.

The method has the advantage of measuring the distribution of axial force values of bolts in the same batch relatively precisely, which is very important for rapid and large-scale pre-screening detection, and is of great significance for saving engineering costs. Sometimes, relative axial force distribution is more important than accurate axial forces of the individual bolts, because bolt fracture, which is generally recognized as the most fatal situation, is usually preceded by a bolt stress or tension problem, and the bolt tension problem is preceded by abnormality caused by non-uniform axial force distribution of the bolts. In the case of a wind turbine as an example, there are generally hundreds of connecting bolts on a flange face of the wind turbine, wherein a small number of bolts with very low or very high axial forces indeed decide the overall connection quality. That is to say, the safety of the wind turbine depends more on the uniformity of axial force distribution of the bolts on the flange face, and does not depend on the axial force of a specific bolt. The method is very effective in quickly picking out some bolts with the lowest axial force and bolts with the highest axial force. In the case of hinged bolts for tracks of a high-speed railway as an example, among the above-mentioned tens of thousands of bolts per kilometer, only those bolts that have excessive tensions to tend to fracture and those bolts that have too little tension to result in loosening are the most fatal to safety, these fractured bolts or the loosened bolts can also increase loads on nearby bolts such that axial forces of the nearby bolts may become very high, and may even cause bolt fracture if maintenance is not performed for a long time. Therefore, it is very important to quickly find out bolts with low or high axial forces in a section of track, that is, to detect the distribution state of axial forces of bolts in a section of track, which can be well done by the method quickly.

Further description is given below in conjunction with specific embodiments.

Embodiment 1

In this embodiment, electromagnetic ultrasonic dual-wave equipment is used to measure bolts of a flange face of a tower of a 2.5 MW wind turbine. The bolts on the tower flange face are of M36 specification and have a number of 136 in total. When preparing to measure the bolts on the flange face, it is found that the bolt specification model, length, thread length, nut position, bolt head thickness and bolt material, or the like of the bolts on the flange face conform to those of bolts with one specification in an empirical database in the equipment, and a k value corresponding to equation (1) for the bolts in the database in the equipment can be used as a calibrated k value or an empirical k value, which is denoted as $k_e$. However, it is found that for the bolts on the flange face, no surplus new uninstalled bolts in the same batch are available to measure a calibrated initial value $R_0$, and the bolts in the batch have characters cut in relief at the right center of the hexagonal heads and ejector pin holes formed in screw end faces. These factors are not conducive to calculating the initial value $R_0$. An empirical initial value or a calibrated initial value $R_0$ can be evaluated according to equation (5). Specific operation steps are as follows:

1. At least 30 bolts in the same batch or on the same flange face are numbered, and it will be better if more.
2. An $R_0$ value generally used for high strength bolts is selected from a database in the equipment as an initial $R_0$ value, which is denoted as $R_{0e}$.
3. An R value of a 1st bolt is measured, which is denoted as $R_1$. A tension $F_1$ of the first bolt is calculated according to equation (6).
4. Step 3 is repeated to obtain an R value of a 2nd bolt, which is denoted as $R_2$. $R_{0e}$ is updated according to equation (5), and the tensions $F_1$ and $F_2$ for the 1st and 2nd bolts are recalculated according to equation (6).
5. Step 4 is repeated to obtain an R value of a 3rd bolt, which is denoted as $R_3$. $R_{0e}$ is updated according to equation (5), and the tensions $F_1$, $F_2$ and $F_3$ for the 1st, 2nd, and 3rd bolts are recalculated according to equation (6).
6. Step 4 is repeated and so on to obtain an R value of an nth bolt, which is denoted as $R_n$. $R_{0e}$ is updated according to equation (5) and the tensions $F_1, F_2 \ldots F_n$ for the 1st, 2nd . . . nth bolts are recalculated according to equation (6).

Figure 2:
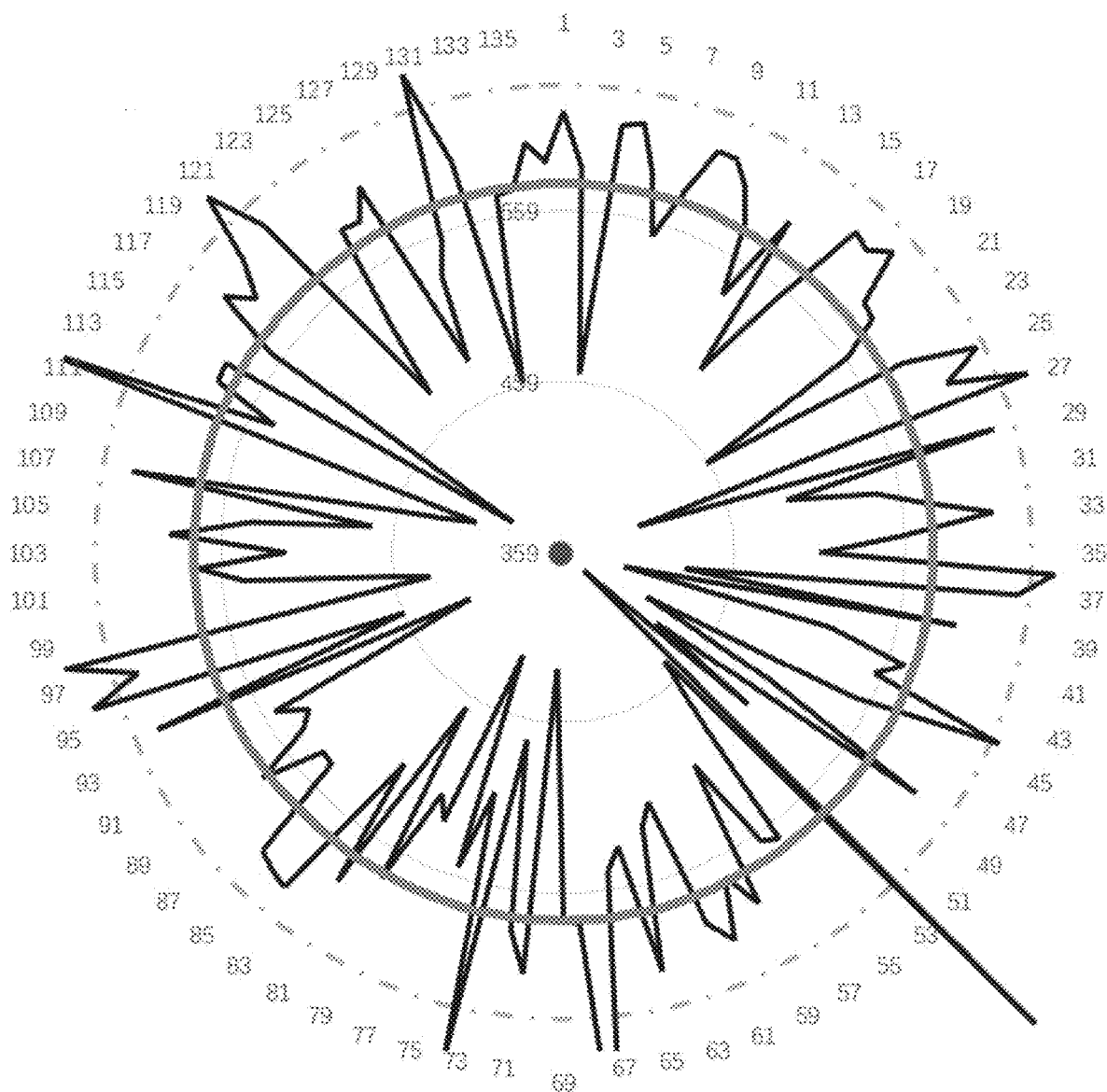
FIG. 2 is a schematic diagram of axial force detection values of M36 bolts on a flange of a tower of a wind turbine in the present disclosure.

In this embodiment, the detection time for each bolt does not exceed 15 s from placing a probe to obtaining detection data. After the individual bolts are detected, the above updates and calculations according to equations (5) and (6) are automatically performed by software in the equipment within time in the order of milliseconds. A graph related to the final detection case of this embodiment is as shown in FIG. 2. It is clear from FIG. 2 which bolts have the lowest axial force or axial forces even lower than an alarm value, and which bolts have the highest axial force or axial forces even higher than an alarm value.

Embodiment 2

When preparing to measure bolts on a flange face, it is found that for the bolts on the flange face, surplus new uninstalled bolts in the same batch are available to measure a calibrated initial value $R_0$. If there are at least 4 bolts, an initial average value of the 4 bolts can be used as the calibrated bolt initial value $R_0$, which is denoted as $R_{0e}$. However, it is found that there are no data in the database in the equipment that conform to the specification model, length, thread length, nut position, or the like of bolts in the batch, a k value applicable in equation (1) for the bolts in the batch is not very certain, and then an empirical slope or calibrated slope k value can be evaluated according to equation (9). Specific operation steps areas follows:

1. At least 30 bolts in a same batch or on a same flange face are numbered, and it will be better if more.

2. A k value for bolts with a model similar to that of the high strength bolts in the batch is selected from a database in the equipment as an initial k value, which is denoted as $k_e$.
3. An R value of a 1st bolt is measured, which is denoted as $R_1$. A tension $F_1$ of the first bolt is calculated according to equation (10).
4. Step 3 is repeated to obtain an R value of a 2nd bolt, which is denoted as $R_2$. $k_e$ is updated according to equation (9), and the tensions $F_1$ and $F_2$ for the 1st and 2nd bolts are recalculated according to equation (10).
5. Step 4 is repeated to obtain an R value of a 3rd bolt, which is denoted as $R_3$. $k_e$ is updated according to equation (9), and the tensions $F_1$, $F_2$ and $F_3$ for the 1st, 2nd, and 3rd bolts are recalculated according to equation (10).
6. Step 4 is repeated and so on to obtain an R value of an nth bolt, which is denoted as $R_n$. $k_e$ is updated according to equation (9) and the tensions $F_1$, $F_2$ ... $F_n$ for the 1st, 2nd ... nth bolts are recalculated according to equation (10).

In this embodiment, after the individual bolts are detected, the above updates and calculations according to equations (9) and (10) are performed by software in the equipment within time in the order of milliseconds.

Embodiment 3

In this embodiment, axial forces of hinged bolts of a section of track are measured by using electromagnetic ultrasonic dual-wave equipment. A complete database is available for ultrasonic dual-wave detection parameters for bolts on a railway, wherein k values have a smaller difference, and a parameter in the database can be called directly, which is denoted as $k_e$. A total of 304 hinged bolts on a tack within 30 meters are used as samples, and an empirical initial value or a calibrated initial value $R_0$ is evaluated according to equation (5). Specific operation steps are as follows:
1. Sample bolts are numbered.
2. An $R_0$ value generally used for high strength bolts is selected from a database in the equipment as an initial $R_0$ value, which is denoted as $R_{0e}$.
3. An R value of a 1st bolt is measured, which is denoted as $R_1$. A tension $F_1$ of the 1st bolt is calculated according to equation (6).
4. Step 3 is repeated to obtain an R value of a 2nd bolt, which is denoted as $R_2$. $R_{0e}$ is updated according to equation (5), and the tensions $F_1$ and $F_2$ for the 1st and 2nd bolts are recalculated according to equation (6).
5. Step 4 is repeated to obtain an R value of a 3rd bolt, which is denoted as $R_3$. $R_{0e}$ is updated according to equation (5), and the tensions $F_1$, $F_2$ and $F_3$ for the 1st, 2nd, and 3rd bolts are recalculated according to equation (6).
6. Step 4 is repeated and so on to obtain an R value of an nth bolt, which is denoted as $R_n$. $R_{0e}$ is updated according to equation (5) and the tensions $F_1$, $F_2$ ... $F_n$ for the 1st, 2nd ... nth bolts are recalculated according to equation (6). Here, the value of n is 304.
7. Tension values of bolts on the following railway are detected by applying equation (6) using the two parameters based on $R_{0e}$ obtained in step 6 and $k_e$ selected from the database.
8. The temperature of the bolts on the track is measured every 20 kilometers, a $k_e$ value corresponding to the current temperature is re-selected from the database; and a new $R_{0e}$ value is calculated from the recently detected 304 bolts by applying equation (5) using the new $k_e$ value.
9. Tension values of the bolts on the following railway are detected by applying equation (6) using the two parameters based on $R_{0e}$ obtained in step 8 and the $k_e$ value newly selected from the database.
10. Step 8 and step 9 are repeated.

In this embodiment, after the individual bolts are detected, the above updates and calculations according to equations (5) and (6) are performed by software in the equipment within time in the order of milliseconds.

Embodiment 4

When preparing to measure bolts on a flange face, it is found that for the bolts on the flange face, no surplus new uninstalled bolts in the same batch are available to measure a calibrated initial value $R_0$. The specific specification model of the bolts is not recorded in the database. Specifications similar to the specification of the bolts are searched in the database, and it is found that 2 specifications of bolts are similar to the specification of the bolts that need to be detected. The difference between the coefficient k values of the two specifications of bolts in equation (1) in the database is no more than 10%. One of the two k values can be selected as an empirical k value of the measured bolts, which is denoted as $k_e'$. Then, another parameter $R_{0e}'$ can be calibrated by using equation (12). Finally, a final axial force value $F_i'$ of the bolts is calculated by using equation (13). Specific operation steps are as follows:
1. At least 30 bolts in a same batch or on a same flange face are numbered, and it will be better if more.
2. From a database in the equipment, a k value for bolts with the model similar to that of the high strength bolts in the batch is selected, and is denoted as $k_e'$, and an $R_0$ value for the bolts with the similar model is selected as an initial $R_0$ value, and is denoted as $R_{0e}'$. Another parameter $R_{0e}'$ is calibrated by using equation (12).
3. An R value of a 1st bolt is measured, which is denoted as $R_1$. A tension $F_1$ of the 1st bolt is calculated according to equation (13).
4. Step 3 is repeated to measure an R value of a 2nd bolt, which is denoted as $R_2$. $R_{0e}'$ is updated according to equation (12). The tensions $F_1$ and $F_2$ for the 1st and 2nd bolt are recalculated according to equation (13).
5. Step 4 is repeated to measure an R value of an nth bolt, which is denoted as $R_n$. $R_{0e}'$ is updated according to equation (12). A tension $F_n$ for the 1st to nth bolts is recalculated according to equation (13).
6. If n>30, it is possible to start determining whether the axial force values of the bolts measured previously and continuously updated, and the axial force value of the bolts measured currently are close to a pretightening axial force and whether the values satisfy a customer's qualification requirement on a pretightening force range.

In this embodiment, after the individual bolts are detected, the above updates and calculations according to equations (12) and (13) are performed automatically by software in the equipment within time in the order of milliseconds.

Embodiment 5

When preparing to measure bolts on a flange face, it is found that for the bolts on the flange face, no surplus new uninstalled bolts in the same batch are available to measure a calibrated initial value $R_0$. The specific specification model of the bolts is not clear, and it is not possible to determine which bolts in the database are of a specification similar to that of the detected bolts. $R_0$ in equation (1) can directly take a common near-theoretical value, for example, 1.830, which is denoted as $R_{0e}'=1.830$. Then, a $k_e'$ value is calibrated by using equation (22). Finally, the measured axial forces of the bolts are calculated by using equation (23). Specific operation steps are as follows:

1. At least 30 bolts in a same batch or on a same flange face are numbered, and it will be better if more.
2. A parameter $R_0$ in equation (1) takes a usual theoretical value of 1.830, which is denoted as $R_{0e}'=1.830$.
3. An initial value of $k_e$ is calibrated by using equation (22), which is denoted as $k_e'$.
4. An R value of a 1st bolt is measured, which is denoted as $R_1$. A tension $F_1$ of the 1st bolt is calculated according to equation (23).
5. An R value of a 2nd bolt is measured, which is denoted as $R_2$. A $k_e'$ value is recalibrated by using equation (22). A tension $F_2$ for the 1st and 2nd bolts is recalculated according to equation (23).
6. Step 5 is repeated to obtain an R value of an nth bolt, which is denoted as $R_n$. A $k_e'$ value is recalibrated by using equation (22). A tension $F_n$ for the 1st to nth bolts is recalculated according to equation (23).
7. If n>30, it can be determined whether the axial force values of the bolts measured previously and continuously updated, and the axial force value of the bolts measured currently are close to a pretightening force, and whether the values satisfy a customer's qualification requirement on a pretightening force range.

A nightingale rose chart is obtained regarding the axial forces of the bolts in Embodiment 1. If the axial force values of the detected workpieces in the embodiment 1 are recalculated using the method of Embodiment 5, a comparison diagram of the original axial force values and axial force values measured according to the method of Embodiment 5 is as shown in FIG. 3.

Figure 3:
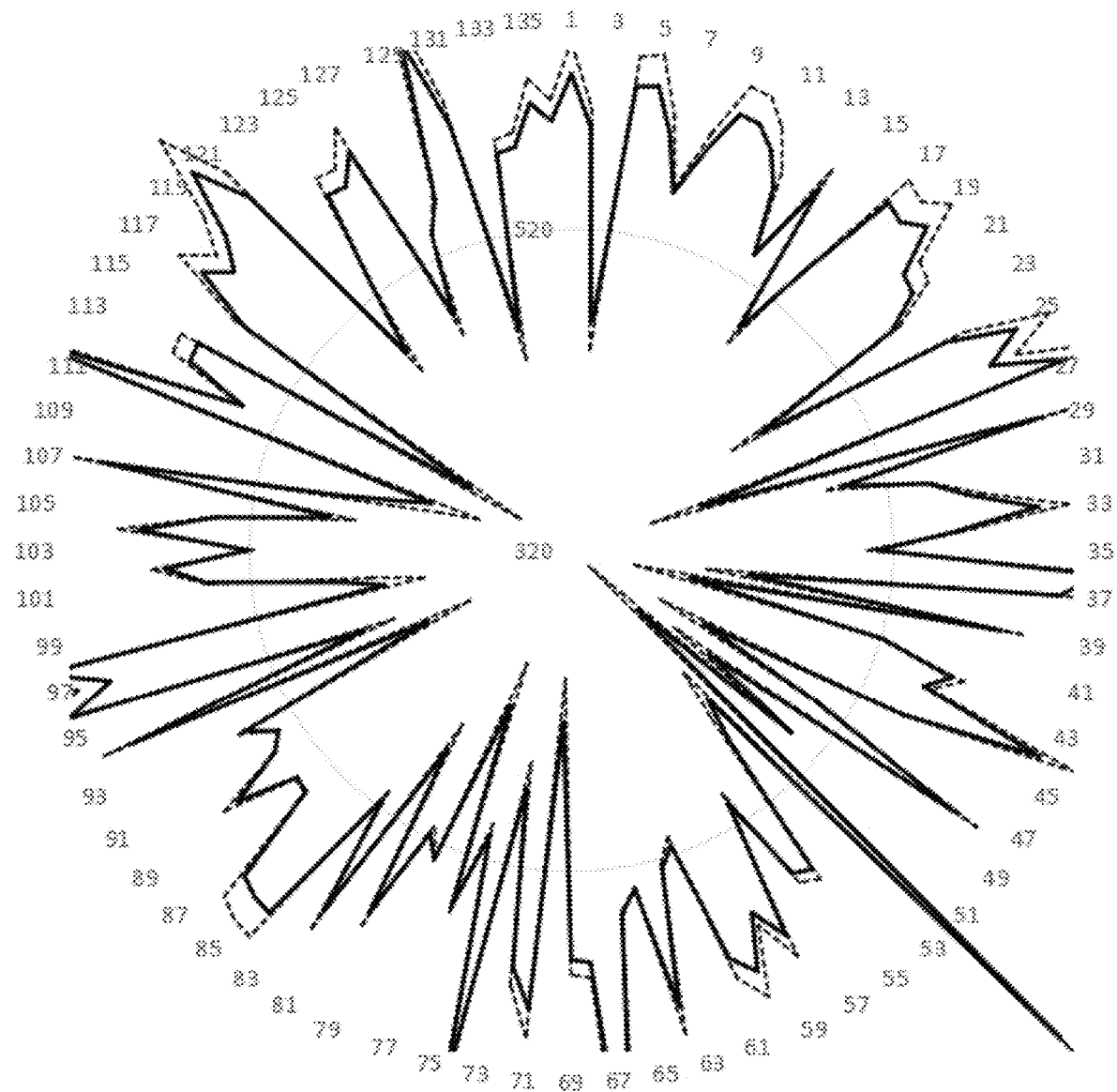
FIG. 3 is another comparison diagram of axial forces of M36 bolts on a flange of a tower of a wind turbine in the present disclosure.

2 conclusions can be drawn from FIG. 3: First, even if the empirical value $R_{0e}'$ selected based on the theoretical value deviates from the actual value $R_{0e}$, the deviation of the final measured axial force is within an acceptable range after other parameters are calibrated using the deviated parameter to obtain other deviated parameters. Second, comparing the measured axial forces obtained using the deviated $R_{0e}'$ value with the values in FIG. 1 shows that the measured values smaller than the average value are smaller than the values in FIG. 1, and the measured values greater than the average value are greater than the values in FIG. 1, and a major mistake of missed judgment does not occur in the final measurement result due to the use of the deviated empirical value $R_{0e}'$.

It should be understood that the foregoing specific embodiments of the present disclosure are only used for exemplarily illustrating and explaining the principle of the present disclosure, rather than limiting the present disclosure. Thus, any modifications, equivalent substitutions, improvements and the like made without departing from the spirit and scope of the present disclosure should be encompassed within the protection scope of the present disclosure. In addition, the appended claims of the present disclosure are intended to cover all variations and modifications that fall within the scope and boundaries of the appended claims, or all variations and modifications that fall within the equivalents of such scope and boundaries.

What is claimed is:

1. A rapid ultrasonic dual-wave calibrated detection method for an axial force of a high strength bolt, comprising the following steps:
   S01: numbering a plurality of high strength bolts in a same detection region;
   S02: searching, in a database in equipment, a calibrated empirical value $R_{0e}$ of initial ratios $R_0$ of ultrasonic transverse wave transit time to ultrasonic longitudinal wave transit time for each of the plurality of high strength bolts with entirely or partially same specification data in a zero stress state, or a calibrated empirical value $k_e$ of a slope k of variation of a bolt tension with a ratio of transverse wave transit time to longitudinal wave transit time for each of the plurality of high strength bolts with entirely or partially same specification data in a zero stress state;
   S03: measuring ratios $R_i$ of the ultrasonic transverse wave transit time to the ultrasonic longitudinal wave transit time for the plurality of high strength bolts, using the ratios $R_i$ to calculate an average value;
   S04: acquiring a nominal pretightening axial force value, using the nominal pretightening axial force value as an average value of tensions of the plurality of high strength bolts, and calculating a calibrated parameter $k_e'$ or $R_{0e}'$ according to assumptions implied in step S02 and S03 that the tension is a linear function to the average value of $R_i$; and
   S05: calculating axial forces of the high strength bolts according to the calibrated parameter a parameter combination of empirical $R_{0e}$ and calculated $k_e'$ or a parameter combination of calculated $R_{0e'}$ and empirical $k_{e'}$.

2. The rapid ultrasonic dual-wave calibrated detection method for the axial force of the high strength bolt according to claim 1, wherein in step S02, before searching in the database in the equipment, whether surplus new uninstalled bolts in the same batch are present in the same detection region is determined first; and under the condition that the surplus new bolts are present, an average value of the initial ratios $R_0$ of the ultrasonic transverse wave transit time to the ultrasonic longitudinal wave transit time for the plurality of high strength bolts in the zero stress state is used as a calibrated empirical value $R_{0e}$, otherwise, searching is performed in the database in the equipment for the calibrated empirical value $R_{0e}$.

3. The rapid ultrasonic dual-wave calibrated detection method for the axial force of the high strength bolt according to claim 1, wherein in step S04, under the condition that the calibrated empirical value $k_e$ of the slope k of the high strength bolts with the entirely same specification data is searched in the database in the equipment, and the calculated parameter $R_{0e'}$ is given by $$R_{0e} = \overline{R_i} - \frac{F_p}{k_e},$$

where $\overline{R_i}$ is an average value of the ratios $R_i$ of the ultrasonic transverse wave transit time to the ultrasonic longitudinal wave transit time for the plurality of high strength bolts, i represents bolt numbers, and $F_p$ represents the nominal pretightening axial force value.

4. The rapid ultrasonic dual-wave calibrated detection method for the axial force of the high strength bolt according to claim 1, wherein in step S04, under the condition that the calibrated empirical value $R_{0e}$ of the initial ratios $R_0$ of the ultrasonic transverse wave transit time to the ultrasonic longitudinal wave transit time for the high strength bolts with the entirely same specification data is searched in the database in the equipment, and the calculated parameter $k_e'$ is given by $$k_e = \frac{F_p}{\overline{R}_i - R_{0e}}.$$

5. The rapid ultrasonic dual-wave calibrated detection method for the axial force of the high strength bolt according to claim 1, wherein in step S04, under the condition that a calibrated empirical value $k_e$ of the slope k of the high strength bolts with the partially same specification data is searched in the database in the equipment, a calculated value of the initial ratio $R_0$ is $$R'_{0e} = \overline{R}_i - \frac{F_p}{k'_e},$$

and estimated axial force values of the high strength bolts are calculated:

$$F'_i = k'_e \left( R_i - \overline{R}_i + \frac{F_p}{k'_e} \right) = k_e(1 + \Delta_{k_e}) \left[ R_i - \overline{R}_i + \frac{F_p}{k_e(1 + \Delta_{k_e})} \right]$$

where $\Delta_{k_e}$ is a relative error of $k_e$ to true value k.

6. The rapid ultrasonic dual-wave calibrated detection method for the axial force of the high strength bolt according to claim 5, wherein step S05 further comprises: under the condition that the number n of calculated high strength bolts is greater than a certain value, determining whether the measured axial force values of the bolts are within a deviation range set for $F_p$; and determining that the measured axial force values are qualified under the condition that the measured axial force values of the bolts are within the deviation range, otherwise, determining that the measured axial force values are unqualified.

7. The rapid ultrasonic dual-wave calibrated detection method for the axial forces of the high strength bolts according to claim 1, wherein in step S04, under the condition that the calibrated empirical value $R_{0e}'$ of the initial ratios $R_0$ of the transverse wave transit time to the longitudinal wave transit time for the high strength bolts with partially same specification data is searched in the database in the equipment, a calibrated estimated value of the slope $k_{e'}$ is $$k'_e = \frac{F_p}{\overline{R}_i - R'_{0e}},$$

and estimated axial force values of the high strength bolts are calculated:

$$F'_i = k'_e(R_i - R_{0e}) = \frac{F_p}{\overline{R}_i - R_0(1 + \Delta_{R_{0e}})} \left[ R_i - R_0(1 + \Delta_{R_{0e}}) \right],$$

where $\Delta_{R_{0e}}$ is a dimensionless relative deviation value of a relative error of $R_{0e}$ to the true value $R_0$.

8. The rapid ultrasonic dual-wave calibrated detection method for the axial force of the high strength bolt according to claim 1, wherein the specification data comprises specification model, length, thread length, nut thickness, nut position, bolt head thickness and bolt material.

* * * * *